United States Patent
Yin et al.

(10) Patent No.: US 12,493,801 B2
(45) Date of Patent: Dec. 9, 2025

(54) DEEP NEURAL NETWORK CHECKPOINT OPTIMIZATION SYSTEM AND METHOD BASED ON NON-VOLATILE MEMORY

(71) Applicant: ShanghaiTech University, Shanghai (CN)

(72) Inventors: Shu Yin, Shanghai (CN); Tianyuan Wu, Shanghai (CN); Yuanhao Li, Shanghai (CN)

(73) Assignee: ShanghaiTech University, Shanghai (CN)

( * ) Notice: Subject to any disclaimer, the term of this patent is extended or adjusted under 35 U.S.C. 154(b) by 0 days.

(21) Appl. No.: 18/696,993

(22) PCT Filed: Feb. 24, 2023

(86) PCT No.: PCT/CN2023/078255
§ 371 (c)(1),
(2) Date: Mar. 28, 2024

(87) PCT Pub. No.: WO2024/174258
PCT Pub. Date: Aug. 29, 2024

(65) Prior Publication Data
US 2025/0371374 A1    Dec. 4, 2025

(30) Foreign Application Priority Data
Feb. 22, 2023    (CN) .......................... 202310153129.5

(51) Int. Cl.
*G06N 3/10*    (2006.01)
*G06T 1/60*    (2006.01)
(52) U.S. Cl.
CPC .................... *G06N 3/10* (2013.01); *G06T 1/60* (2013.01)

(58) Field of Classification Search
CPC ....................................................... G06N 3/10
See application file for complete search history.

(56) References Cited

U.S. PATENT DOCUMENTS

| 10,776,164 B2 * | 9/2020 | Zhao ..................... G06N 3/063 |
| 2021/0383240 A1 | 12/2021 | Gaidon et al. |

FOREIGN PATENT DOCUMENTS

| CN | 111078607 A | 4/2020 |
| CN | 114282665 A | 4/2022 |

(Continued)

OTHER PUBLICATIONS

Rojas et al ("A Study of Checkpointing in Large Scale Training of Deep Neural Networks" 2021) (Year: 2021).*

(Continued)

*Primary Examiner* — Lut Wong
(74) *Attorney, Agent, or Firm* — IPRTOP LLC (57) ABSTRACT

Deep neural network checkpoint optimization system and method based on non-volatile memory are provided, where the client module and the server module register corresponding network structures in non-volatile memory and create data indexes and data communication protocols based on remote direct memory access (RDMA) before the start of training deep neural networks, and during the neural network training process, provide zero-copy, asynchronous, end-to-end neural network data persistence, which allows users to perform fine-grained checkpointing to ensure fault tolerance and data persistence without affecting the training speed.

10 Claims, 3 Drawing Sheets

(56) References Cited

FOREIGN PATENT DOCUMENTS

| | | |
|---|---|---|
| CN | 115310605 A | 11/2022 |
| CN | 115345285 A | 11/2022 |

OTHER PUBLICATIONS

Wang et al ("Enabling Efficient Large-Scale Deep Learning Training with Cache Coherent Disaggregated Memory Systems" 2022) (Year: 2022).*

Mohan et al ("CheckFreq: Frequent, Fine-Grained DNN Checkpointing" 2021) (Year: 2021).*

\* cited by examiner

S1 — before a start of training each neural network model, sending a network structure obtained by initializing one corresponding neural network model stored in the GPU memory to the server module by the client module, constructing an index structure of the neural network model on the non-volatile memory, and establishing end-to-end communication between the GPU memory and the non-volatile memory S2 — when the server module receives a checkpoint request from the client module during training of the neural network model, directly reading corresponding model data from the GPU memory to the non-volatile memory based on the index structure of the neural network model

DEEP NEURAL NETWORK CHECKPOINT OPTIMIZATION SYSTEM AND METHOD BASED ON NON-VOLATILE MEMORY

TECHNICAL FIELD

The present disclosure relates to the technical field of storage systems and deep learning systems in computer science, and in particular, to a deep neural network checkpoint optimization system and method based on non-volatile memory.

BACKGROUND OF THE INVENTION

With the increasing complexity of neural network model structure and training cluster system, the persistence of training model, and data fault tolerance have become important issues in large-scale training systems.

The current checkpointing of neural networks involves multiple software and hardware layers, such as GPU, network, storage, etc. The complexity of the software layer prevents high-performance hardware devices from being fully utilized, thus severely affecting the read-and-write performance during data persistence. Additionally, the performance of existing solutions is inadequate, resulting in a lack of fine-grained checkpoint mechanisms for neural network training, low fault tolerance, and a lack of fast data recovery mechanisms. Furthermore, during distributed and multi-user modern neural network training processes, hardware and system failures are frequent, thus requiring high-performance data persistence mechanisms. However, the existing systems fell short of incorporating the above mechanisms.

SUMMARY OF THE INVENTION

The present disclosure provides a deep neural network checkpoint optimization system and method based on non-volatile memory.

The deep neural network checkpoint optimization system based on non-volatile memory includes a client module in a computing node equipped with a GPU memory and a server module in a storage node equipped with a non-volatile memory. Before the start of each neural network model training, the client module sends a network structure obtained by initializing a corresponding neural network model stored in the GPU memory to the server module and constructs an index structure of the neural network model on the non-volatile memory, to establish end-to-end communication between the GPU memory and the non-volatile memory. When the server module receives a checkpoint request from the client module during training of the neural network model, corresponding model data is directly read from the GPU memory to the non-volatile memory based on the index structure of the neural network model.

In an embodiment of the present disclosure, a method for the client module to initialize the corresponding neural network model stored in the GPU memory to obtain the network structure includes: collecting GPU memory pointers corresponding to each level of the neural network model through a neural network framework; using an NVIDIA Peer Memory kernel module to register a GPU address space of each level of the neural network model as a RDMA memory region based on the GPU memory pointers corresponding to the level of the neural network model, and providing each RDMA memory region with a unique identifier; and matching metadata of each level of the neural network model with the unique identifier of the RDMA memory region corresponding to the level of the neural network model, and aggregating all identifier-metadata pairs into a model structure package.

In an embodiment of the present disclosure, a method for the client module to construct the index structure of the neural network model on the non-volatile memory includes: upon receiving the model structure package, selecting a thread from a thread pool, and constructing the index structure corresponding to the neural network model on the non-volatile memory by this thread based on the model structure package, to respectively map each level of the neural network model to a checkpoint structure.

In an embodiment of the present disclosure, the index structure is a three-level index structure including a model table at a first level, model metadata at a second level, and model data information at a third level.

In an embodiment of the present disclosure, before the server module receives the checkpoint request from the client module, the client module obtains a corresponding GPU memory pointer, and generates and sends the checkpoint request to the server module after the client module receives a user checkpoint request during the neural network model training process.

Correspondingly, a method for the server module to directly read the corresponding model data from the GPU memory to the non-volatile memory based on the index structure of the neural network model comprises: according to the checkpoint request from the client module, controlling a corresponding thread and directly reading the corresponding model data from the GPU memory to the non-volatile memory through a RDMA read operation based on the index structure.

In an embodiment of the present disclosure, when the server module receives a data recovery request from the client module, the server module actively writes the corresponding model data from the non-volatile memory into the GPU memory, based on the index structure of the neural network model.

In an embodiment of the present disclosure, the client module communicates with the server module via an IPoIB protocol or a TCP protocol.

In an embodiment of the present disclosure, the neural network framework is a PyTorch software library.

The present disclosure also provides a deep neural network checkpoint optimization method based on non-volatile memory, which is applied to the deep neural network checkpoint optimization system based on non-volatile memory including the client module in the computing node equipped with the GPU memory and the server module in the storage node equipped with the non-volatile memory. The method includes: before the start of training each neural network model, sending a network structure obtained by initializing one corresponding neural network model stored in the GPU memory to the server module by the client module, constructing an index structure of the neural network model on the non-volatile memory, and establishing communication between the GPU memory and the non-volatile memory; and when the server module receives a checkpoint request from the client module during training of the neural network model, directly reading corresponding model data from the GPU memory to the non-volatile memory based on the index structure of the neural network model.

In an embodiment of the present disclosure, when the server module receives a data recovery request from the client module, based on the index structure of the neural network model, it actively writes the corresponding model data from the non-volatile memory into the GPU memory.

As described above, the present disclosure provides a deep neural network checkpoint optimization system and method based on non-volatile memory, which have the following beneficial effects: the client module and the server module register corresponding network structures in non-volatile memory and create data indexes and data communication protocols based on remote direct memory access (RDMA) before the start of training deep neural networks, and during the neural network training process, provide zero-copy, asynchronous, end-to-end neural network data persistence, which allows users to perform fine-grained checkpointing to ensure fault tolerance and data persistence without affecting the training speed.

DETAILED DESCRIPTION OF THE INVENTION

The following specific examples are provided to illustrate the embodiments of the present disclosure. Those skilled in the art can easily understand other advantages and benefits of the present disclosure based on the contents in this specification. The present disclosure may also be implemented or applied in different other specific embodiments, and various details in this specification may also be modified or changed in various ways based on different views and applications without departing from the spirit of the present disclosure. It should be noted that the following embodiments and the features in the embodiments can be combined with each other without conflict.

It should also be noted that in the following description, reference is made to the accompanying drawings which describe several embodiments of the present disclosure. It should be understood that other embodiments may be used and that mechanical composition, structural, electrical, and operational changes may be made without departing from the spirit and scope of the present disclosure. The following detailed description should not be considered limiting and the scope of the embodiments of the present disclosure is restricted only by the claims of the published patent. The terms used herein are only for the purpose of describing specific embodiments and are not intended to limit the present disclosure. Space-related terms, such as "up", "down", "left", "right", "beneath", "below", "lower", "above", "upper", and the like may be used in the context to facilitate the description of the relationship between an element or feature and another element or feature in the drawings.

Throughout the specification, when it is said that a part is "connected" to another part, this includes not only cases of "direct connection" but also cases of "indirect connection" by placing other elements between them. In addition, when it is said that a certain part "includes" certain constituent elements, unless there is explicit contrary information, it does not mean that other constituent elements are excluded, but rather implies that other constituent elements may also be included.

The terms first, second, and third mentioned herein are used, but not limited to, for the purpose of describing a variety of parts, compositions, regions, layers, and/or segments. These terms are only used to distinguish a certain part, component, region, layer, or segment from other parts, components, regions, layers, or segments. Accordingly, the first part, component, region, layer, or segment described below may refer to the second part, component, region, layer, or segment within the scope of the present disclosure.

Furthermore, as used herein, the singular forms "a", "an", and "the" are intended to include plural forms as well, unless the context dictates otherwise. It should be further understood that the terms "include" and "comprise" indicate the presence of the described feature, operation, element, component, item, type, and/or group, but do not exclude the existence, occurrence, or addition of one or more other features, operations, elements, components, items, types, and/or groups the existence, appearance, or addition of a group. The terms "or" and "and/or" as used herein are interpreted as inclusive, meaning either one or any combination. Therefore, "A, B, or C" or "A, B, and/or C" means "either of the following: A; B; C; A and B; A and C; B and C; and A, B, and C. The exceptions to the definition occur only when combinations of components, functions, or operations are inherently mutually exclusive in certain ways.

A deep neural network checkpoint optimization system based on non-volatile memory of the present disclosure registers corresponding network structures in non-volatile memory by a client module and a server module, creates a data index and a data communication protocol based on remote direct memory access (RDMA) before the start of training a deep neural network, and during the neural network training process, provides zero-copy, asynchronous, end-to-end neural network data persistence, which allows users to perform fine-grained checkpointing to ensure fault tolerance and data persistence without affecting the training speed.

The following detailed description is provided for embodiments of the present disclosure with reference to the accompanying drawings so that they can be easily implemented by those skilled in the art. The present disclosure may be implemented in many different forms and is not limited to the embodiments illustrated herein.

Figure 1:
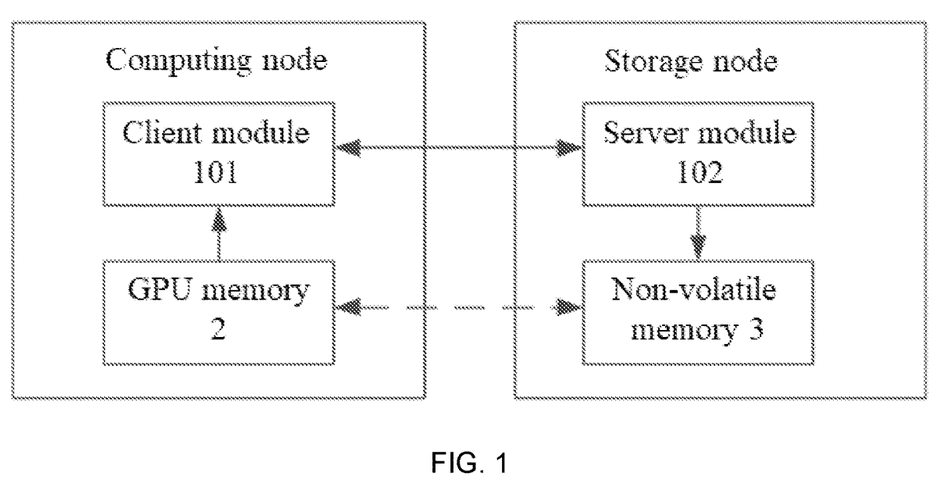
FIG. 1 shows a structural schematic diagram of a deep neural network checkpoint optimization system based on non-volatile memory in one embodiment of the present disclosure.

FIG. 1 shows a structural schematic diagram of a deep neural network checkpoint optimization system based on non-volatile memory in one embodiment of the present disclosure.

The system includes:
 a client module 101, within a computing node equipped with a GPU memory 2, wherein the client module 101 serves as an extension of a neural network framework, is invoked by the user's neural network training program, and is connected to the GPU memory 2; where the GPU memory 2 stores the corresponding neural network model data;

a server module 102, within a storage node equipped with non-volatile memory 3, wherein the server module 102 runs as a standalone application in the storage node equipped with non-volatile memory and provides data indexing, communication, and non-volatile memory management services;

where the server module 102 is communicatively connected to the client module 101.

Before the start of each neural network model training, the client module 101 sends the network structure obtained by initializing the corresponding neural network model stored in the GPU memory 2 to the server module 102 and constructs an index structure of the neural network model on the non-volatile memory, to establish end-to-end communication between the GPU memory 2 and the non-volatile memory 3.

When the server module 102 receives a checkpoint request related to one neural network model from the client module 101 during training of this corresponding neural network model, the corresponding model data (checkpoint file) is directly read from (aka, copied from, or transferred from) the GPU memory 2 to the non-volatile memory 3 based on the index structure of this neural network model.

Therefore, in the process of writing a checkpoint, the present disclosure uses a data transmission flow with a direction opposite to that of the traditional data transmission flow to reduce user-kernel mode switching overhead. The checkpoint file is not written by the client module 101, but rather the server module 102 actively reads the checkpoint file from the GPU memory 2 to the non-volatile memory 3.

In another embodiment, upon data recovery, the server module 102 also actively writes the model data into the GPU memory 2 of the client module in an end-to-end manner; that is, when the server module 102 receives a data recovery request from the client module 101, based on the index structure of that neural network model, the server module 102 actively writes the corresponding model data from the non-volatile memory 3 into the GPU memory 2.

Combining the aforementioned checkpoint writing and data recovery methods, this data flow separates client training from server data persistence, thus achieving an asynchronous checkpointing mechanism that is client-agnostic.

In an embodiment, the client module 101 communicates with the server module 102 via the TCP protocol.

In an embodiment, the neural network framework is the PyTorch software library; and the client module 101 is included in the PyTorch software library.

In an embodiment, the neural network framework is connected to the GPU memory via the PCIe bus.

In an embodiment, a method for the client module 101 to initialize the corresponding neural network model stored in the GPU memory 2 to obtain the network structure comprises:

collecting GPU memory pointers corresponding to each level of the neural network model through the neural network framework;

using an NVIDIA Peer Memory kernel module to register a GPU address space of each level of the neural network model as an RDMA memory region based on the GPU memory pointers corresponding to the respective level of the neural network model, and providing each RDMA memory region with a unique identifier;

matching metadata of each level of the neural network model with the unique identifier of the RDMA memory region corresponding to the respective level of the neural network model, and aggregating all identifier-metadata pairs into a model structure package to depict the structure of this neural network model, and sending the model structure package from the client module 101 to the server module 102 after initialization.

Figure 2:
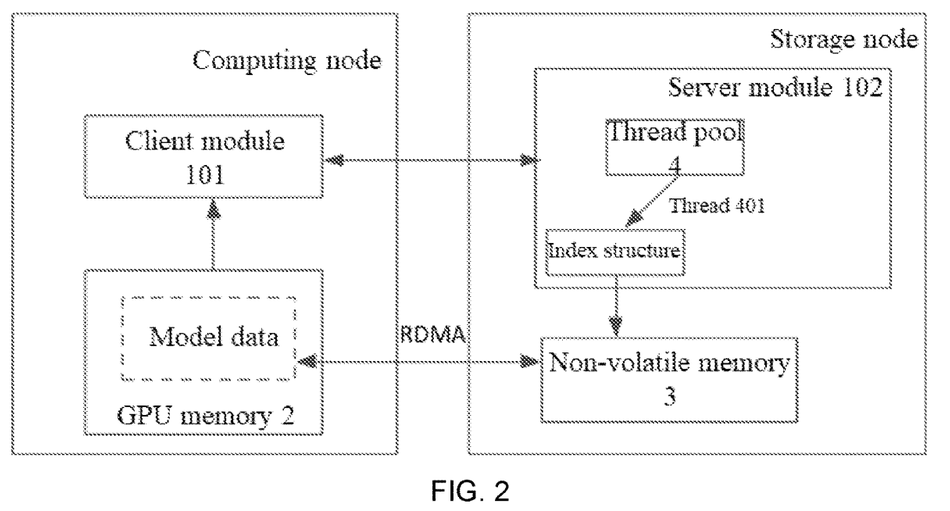
FIG. 2 shows a structural schematic diagram of a deep neural network checkpoint optimization system based on non-volatile memory in another embodiment of the present disclosure.

In one embodiment, as shown in FIG. 2, a method for the client module 101 to construct the index structure of the neural network model on the non-volatile memory 3 includes: upon receiving the model structure package from the client module 101, selecting an available thread 401 from a thread pool 4 and then assigning the model structure package to that thread; constructing the index structure corresponding to the neural network model on the non-volatile memory 3 by this thread based on the model structure package, to respectively map each level of the neural network model to the checkpoint structure.

In an embodiment, the index structure is a three-level index structure comprising a model table at a first level, model metadata at a second level, and model data information at a third level.

Specifically, the thread will maintain the three-level index structure of model table-model metadata-model data in the non-volatile memory based on the information in the structure package. A method for the thread to construct the three-level index structure comprises: registering a model name in the model table, creating a new model metadata block in the non-volatile memory to record the model structure, so as to respectively map each level of the neural network to the checkpoint structure; allocating an area in the non-volatile memory for each level of the neural network; establishing end-to-end communication between the GPU memory and the non-volatile memory through the server module.

In an embodiment, before the server module 102 receives the checkpoint request from the client module during training of the corresponding neural network model, the client module 101 obtains the corresponding GPU memory pointer and generates and sends the checkpoint request to the server module 102 after the client module 101 receives a user checkpoint request during the neural network model training process.

Correspondingly, a method for the server module 102 to directly read the corresponding model data from the GPU memory 2 to the non-volatile memory 3 based on the index structure of this neural network model includes:

according to the checkpoint request from the client module, controlling the thread corresponding to the model by the server module 102 to obtain the RDMA memory region of the model data in the GPU memory based on the corresponding index structure, reading the model data into the storage area of the non-volatile memory, and then directly reading the model data from the GPU memory 2 to the non-volatile memory 3 through a RDMA read operation.

In order to better illustrate the above deep neural network checkpoint optimization system based on non-volatile memory, the present disclosure provides the following specific embodiments.

Figure 3:
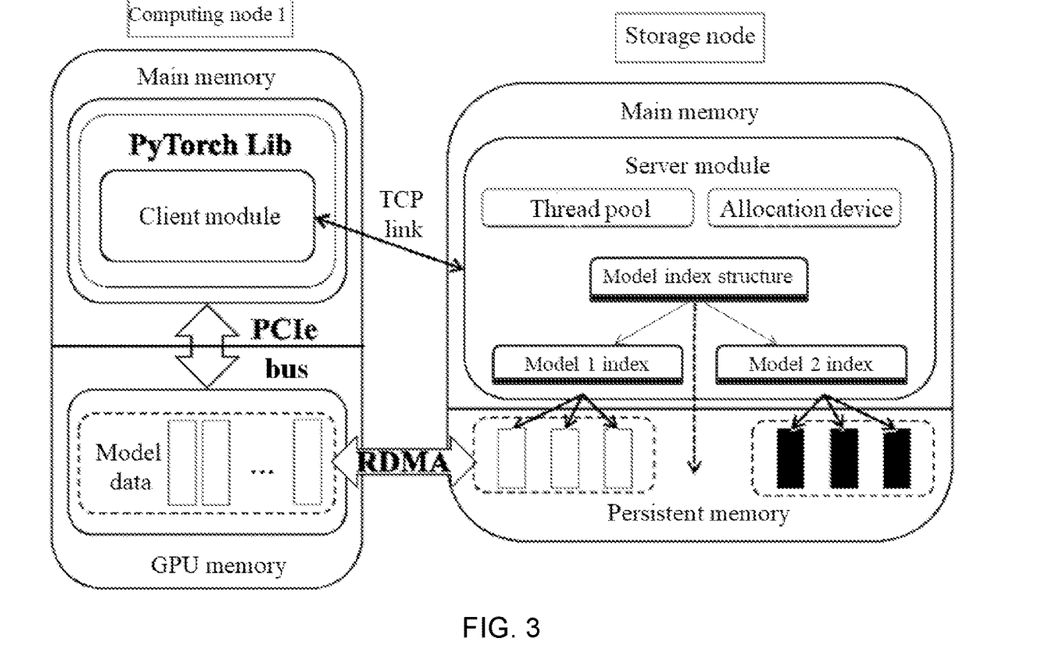
FIG. 3 shows a structural schematic diagram of a deep neural network checkpoint optimization system based on non-volatile memory in another embodiment of the present disclosure.

Embodiment 1: a deep neural network checkpoint optimization system based on non-volatile memory. FIG. 3 shows a structural schematic diagram of the deep neural network checkpoint optimization system based on non-volatile memory in this embodiment of the present disclosure.

The system includes:

a computing node, including a GPU memory and a main memory containing PyTorch software library, the two of which are connected through a PCIe bus, where a client module of the present disclosure is included in PyTorch software library of the computing node;

a storage node, including a locally connected persistent memory and a memory containing a server module.

At the start of a new neural network model training task, the client module first collects GPU memory pointers of each level of the neural network model via PyTorch. The client module then uses an NVIDIA Peer Memory kernel module to register a GPU address space of each level as a RDMA memory region and assigns a unique identifier to each RDMA memory region. After registration, the client module aggregates all these identifiers with the metadata (including size, data type, etc.) of all layers into a model structure package to depict the structure of this neural network model, wherein each identifier is paired with metadata of a corresponding layer. The client module then sends the structure package to the server module through a TCP link. Upon receipt of this structure package, the server module selects an available thread from a thread pool via an allocation device and assigns this package to that thread. The thread will maintain a three-level index structure of model table-model metadata-model data in the non-volatile memory based on the information in the structure package. Specifically, the thread first registers the model name in the model table and creates a new model metadata block in non-volatile memory to record the model structure, so that all levels of the neural network can be mapped to the checkpoint structure, respectively. The thread then allocates a non-volatile memory region for each level of the neural network. Finally, the server module establishes end-to-end communication between the GPU memory of the client module and the non-volatile memory of the server module.

The client module described in the present disclosure can receive the user's checkpoint request, obtain the GPU memory pointers model of the model data, and interact with the server module described in the present disclosure through TCP and RDMA links. The server module described in the present disclosure is arranged in the storage node, where the service module processes requests from the client module, performs data management and indexing on the persistent memory, and writes model data to the persistent memory by RDMA.

The client module of this embodiment is a plugin or add-on module for the PyTorch deep learning library, and the server module is a standalone executable file. The combination of the client module and the server module can realize the goal of improving the performance of checkpoints without affecting the user's computing process.

Similar in principle to the above embodiment, the present disclosure further provides a deep neural network checkpoint optimization method based on non-volatile memory.

Figure 4:
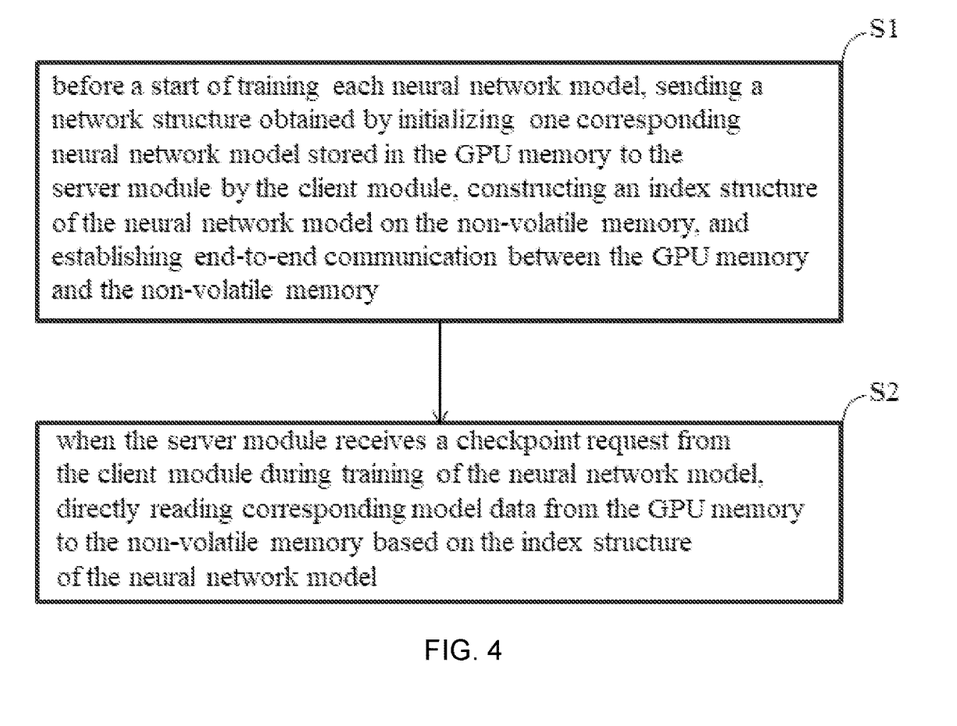
FIG. 4 shows a flow diagram of a deep neural network checkpoint optimization method based on non-volatile memory in one embodiment of the present disclosure.

Specific embodiments are provided below in conjunction with the accompanying drawings:

FIG. 4 shows a flow diagram of a deep neural network checkpoint optimization method based on non-volatile memory in one embodiment of the present disclosure.

The method is applied to the deep neural network checkpoint optimization system based on non-volatile memory including the client module arranged in the computing node equipped with the GPU memory and the server module arranged in the storage node equipped with the non-volatile memory. The system can implement the optimization of deep neural network checkpoint functions based on the non-volatile memory in the above embodiment.

The method includes:

step S1: before the start of training each neural network model, initializing a corresponding neural network model stored in a GPU memory to obtain a network structure that is sent to the server module, constructing an index structure of the neural network model on a non-volatile memory, and establishing end-to-end communication between the GPU memory and the non-volatile memory.

In an embodiment, a method for the client module to initialize the corresponding neural network model stored in the GPU memory to obtain the network structure includes: collecting GPU memory pointers corresponding to each level of the neural network model through a neural network framework; using an NVIDIA Peer Memory kernel module to register a GPU address space of each level of the neural network model as a RDMA memory region based on the GPU memory pointers corresponding to the level of the neural network model, and providing each RDMA memory region with a unique identifier; and matching metadata of each level of the neural network model with the unique identifier of the RDMA memory region corresponding to the level of the neural network model, and aggregating all identifier-metadata pairs into a model structure package.

In one embodiment, a method for the client module to construct the index structure of the neural network model on the non-volatile memory includes: upon receiving the model structure package, selecting an available thread from a thread pool; constructing the index structure corresponding to the neural network model on the non-volatile memory by this thread based on the model structure package, to respectively map each level of the neural network model to the checkpoint structure.

In an embodiment, the index structure is a three-level index structure comprising a model table at a first level, model metadata at a second level, and model data information at a third level.

In an embodiment, the client module communicates with the server module via the IPoIB protocol or the TCP protocol.

In an embodiment, the neural network framework is the PyTorch software library.

Step S2: when the server module receives a checkpoint request from the client module during training of the neural network model, directly reading corresponding model data from the GPU memory to the non-volatile memory based on the index structure of the neural network model.

In an embodiment, step S2 includes: obtaining the corresponding GPU memory pointer, generating and sending the checkpoint request to the server module by the client module after the client module receives a user checkpoint request during the neural network model training process; according to the checkpoint request from the client module, controlling the thread by the server module to direct read the model data into the non-volatile memory from the GPU memory based on the index structure and a RDMA read operation.

In an embodiment, the method further includes actively writing, by the server module, the corresponding model data from the non-volatile memory to the GPU memory based on the index structure of the neural network model when the server module receives a data recovery request from the client module.

Since the implementation principles of the deep neural network checkpoint optimization method based on non-volatile memory have been described in the foregoing embodiments, therefore, details will not be repeated herein.

To better illustrate the above deep neural network checkpoint optimization method based on non-volatile memory, the present disclosure provides the following specific embodiments.

Figure 5:
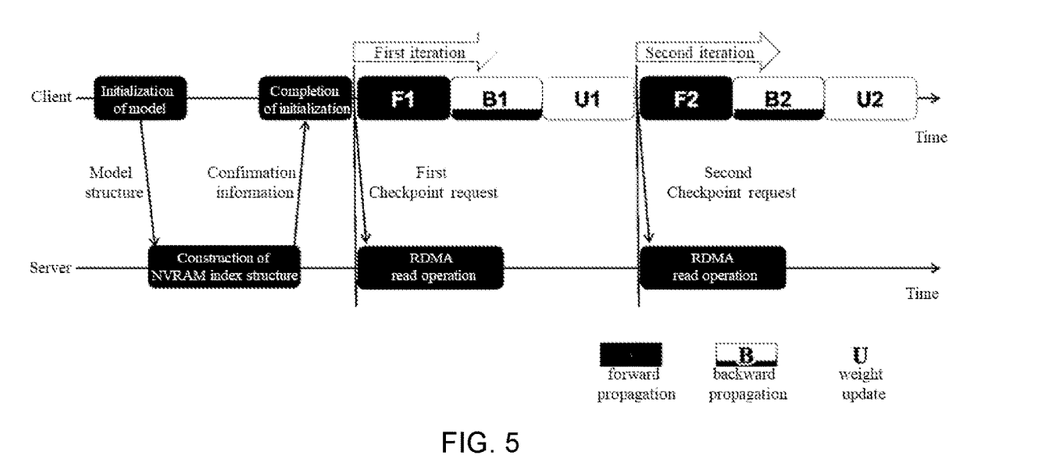
FIG. 5 shows a schematic diagram of a data read-and-write process in one embodiment of the present disclosure.

Embodiment 1: a method for writing deep neural network checkpoint based on non-volatile memory. FIG. 5 shows a schematic diagram of a data read-and-write process in one embodiment of the present disclosure.

The method includes:

during a data checkpoint operation:
1. sending a model structure to a server module, wherein the model structure is obtained from the initialization of a model by a client module;
2. constructing an index structure on nonvolatile memory through the model structure, and sending confirmation information to the client after successful construction of the index structure by the server module;
3. finishing the initialization and performing a calculation after the client receives the confirmation information;
4. sending a checkpoint request to the server module by the client module at the start of the calculation, copying the needed model data in a GPU memory to the non-volatile memory of the server module by the server module based on the index structure through a RDMA read operation;
5. completing the RDMA operation before the client module updates the weight, so that the client module can carry out a data calculation without interruption.

It should be noted that during the model training process, a checkpoint writing operation is needed to be performed after each round of forward propagation, backward propagation, and each weight update operation.

This embodiment provides a purely user-state fast checkpoint data pathway and management method based on non-volatile memory via the above modules. Significant performance improvements are demonstrated in both benchmarks and practical application scenarios. For neural network models used in practical applications such as computer vision and natural language processing, data persistence performance is increased by up to 9.2 times, and data recovery performance is increased by 7.0 times in this embodiment compared to the existing checkpointing mechanisms. At the same time, this embodiment realizes an asynchronous data transfer mechanism with zero copy, end-to-end data transfer, and zero waiting for the client.

In summary, the present disclosure provides a deep neural network checkpoint optimization system and method based on non-volatile memory. The corresponding network structure is registered in non-volatile memory by the client module and the server module before the start of deep neural network training, and the data indexes and the data communication protocol based on remote direct memory access (RDMA) are created. During the neural network training process, the present disclosure achieves zero-copy, asynchronous, and end-to-end neural network data persistence, thus allowing users to perform fine-grained checkpointing, which ensures fault tolerance and data persistence, without affecting training speed. Therefore, the present disclosure effectively overcomes the shortcomings of the prior art and has high industrial utilization value.

The above examples are only illustrative to explain the principles and effectiveness of the present disclosure, and are not intended to limit the present disclosure. Any person skilled in the art may modify or change the above embodiments without violating the spirit and scope of the present disclosure. Accordingly, all equivalent modifications or changes made by persons having ordinary knowledge of the art without departing from the spirit and technical ideas disclosed herein shall still be covered by the claims of the present disclosure.

The invention claimed is:

1. A deep neural network checkpoint optimization system based on non-volatile memory, comprising: a client module in a computing node equipped with a GPU memory, and a server module in a storage node equipped with a non-volatile memory;
   wherein before a start of each neural network model training, the client module sends a network structure obtained by initializing a corresponding neural network model stored in the GPU memory to the server module and constructs an index structure of the neural network model on the non-volatile memory, to establish end-to-end communication between the GPU memory and the non-volatile memory; and
   wherein when the server module receives a checkpoint request from the client module during training of the neural network model, corresponding model data is directly read from the GPU memory to the non-volatile memory based on the index structure of the neural network model.

2. The deep neural network checkpoint optimization system based on the non-volatile memory according to claim 1, wherein a method for the client module to initialize the corresponding neural network model stored in the GPU memory to obtain the network structure comprises:
   collecting GPU memory pointers corresponding to each level of the neural network model through a neural network framework;
   using an NVIDIA Peer Memory kernel module to register a GPU address space of each level of the neural network model as a RDMA memory region based on the GPU memory pointers corresponding to the level of the neural network model, and providing each RDMA memory region with a unique identifier; and
   matching metadata of each level of the neural network model with the unique identifier of the RDMA memory region corresponding to the level of the neural network model, and aggregating all identifier-metadata pairs into a model structure package.

3. The deep neural network checkpoint optimization system based on the non-volatile memory according to claim 2, wherein a method for the client module to construct the index structure of the neural network model on the non-volatile memory comprises:
   upon receiving the model structure package, selecting a thread from a thread pool, and constructing the index structure corresponding to the neural network model on the non-volatile memory by this thread based on the model structure package, to respectively map each level of the neural network model to a checkpoint structure.

4. The deep neural network checkpoint optimization system based on the non-volatile memory according to claim 3, wherein the index structure is a three-level index structure comprising a model table at a first level, model metadata at a second level, and model data information at a third level.

5. The deep neural network checkpoint optimization system based on the non-volatile memory according to claim 4,
   wherein before the server module receives the checkpoint request from the client module, the client module obtains a corresponding GPU memory pointer, and generates and sends the checkpoint request to the server module after the client module receives a user checkpoint request during the neural network model training process;
   wherein a method for the server module to directly read the corresponding model data from the GPU memory to the non-volatile memory based on the index structure of the neural network model comprises: according to the checkpoint request from the client module, controlling a corresponding thread and directly reading the corresponding model data from the GPU memory to the non-volatile memory through a RDMA read operation based on the index structure.

6. The deep neural network checkpoint optimization system based on the non-volatile memory according to claim 1, wherein when the server module receives a data recovery request from the client module, the server module actively writes the corresponding model data from the non-volatile memory into the GPU memory, based on the index structure of the neural network model.

7. The deep neural network checkpoint optimization system based on the non-volatile memory according to claim 1, wherein the client module communicates with the server module via a TCP protocol.

8. The deep neural network checkpoint optimization system based on the non-volatile memory according to claim 2, wherein the neural network framework is a PyTorch software library.

9. A deep neural network checkpoint optimization method based on non-volatile memory, which is applied to a deep neural network checkpoint optimization system based on non-volatile memory comprising a client module in a computing node equipped with a GPU memory and a server module in a storage node equipped with a non-volatile memory, the method comprising:
- before a start of training each neural network model, sending a network structure obtained by initializing one corresponding neural network model stored in the GPU memory to the server module by the client module, constructing an index structure of the neural network model on the non-volatile memory, and establishing end-to-end communication between the GPU memory and the non-volatile memory; and
- when the server module receives a checkpoint request from the client module during training of the neural network model, directly reading corresponding model data from the GPU memory to the non-volatile memory based on the index structure of the neural network model.

10. The deep neural network checkpoint optimization method based on non-volatile memory according to claim 9, further comprising:
- when the server module receives a data recovery request from the client module, based on the index structure of the neural network model, actively writing the corresponding model data from the non-volatile memory into the GPU memory.

* * * * *